United States Patent [19]
Lorenz et al.

[11] 3,747,822
[45] July 24, 1973

[54] DRIVE MECHANISM FOR THE CLAMPING CARRIAGES OF PEELING MACHINES

[75] Inventors: Horst Lorenz, Solingen; Karl Gustav Weck, Solingen-Wald, both of Germany

[73] Assignee: Th. Kieserling & Albrecht, Solingen, Germany

[22] Filed: Jan. 17, 1972

[21] Appl. No.: 218,364

[30] Foreign Application Priority Data
Feb. 15, 1971  Germany.................. P 21 07 159.0

[52] U.S. Cl...................... 226/162, 214/1.1, 82/2.5, 82/20
[51] Int. Cl........................................... B65h 17/36
[58] Field of Search ................ 82/20, 2.5; 214/1.1, 214/1.4; 226/162

[56] References Cited
UNITED STATES PATENTS
3,350,965  11/1967  Brauer et al........................... 82/20
2,311,998  2/1943  Pope........................................ 82/20

Primary Examiner—Leonidas Vlachos
Attorney—Edward E. Sachs

[57] ABSTRACT

A drive for the clamping carriage of a bar or rod peeler. The drive utilizes opposed driven rollers or the like, which operate in conjunction with a track or rod to effect movement of the carriage between first and second stations.

11 Claims, 5 Drawing Figures

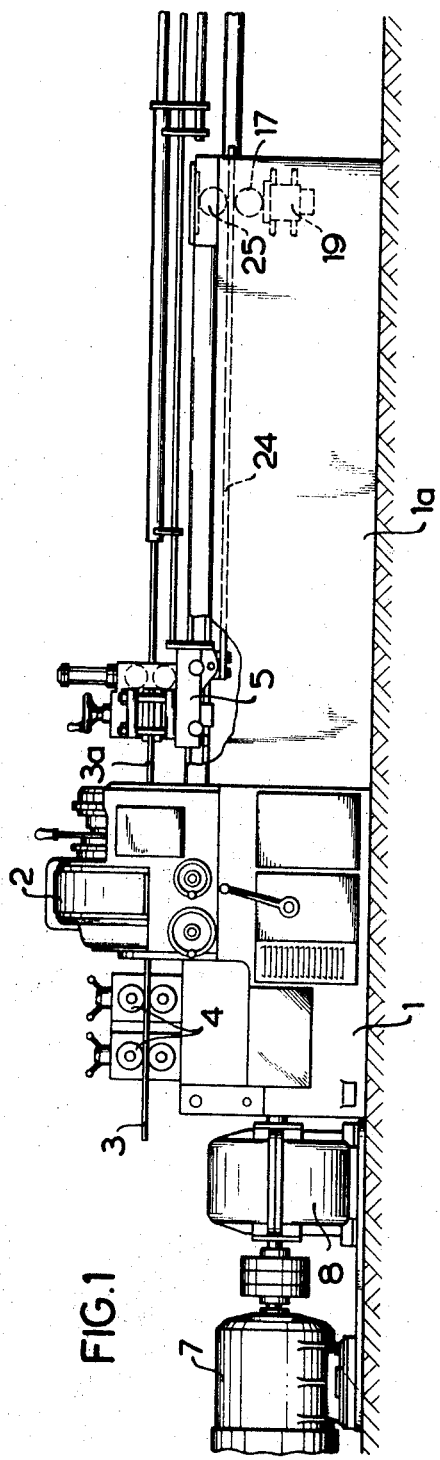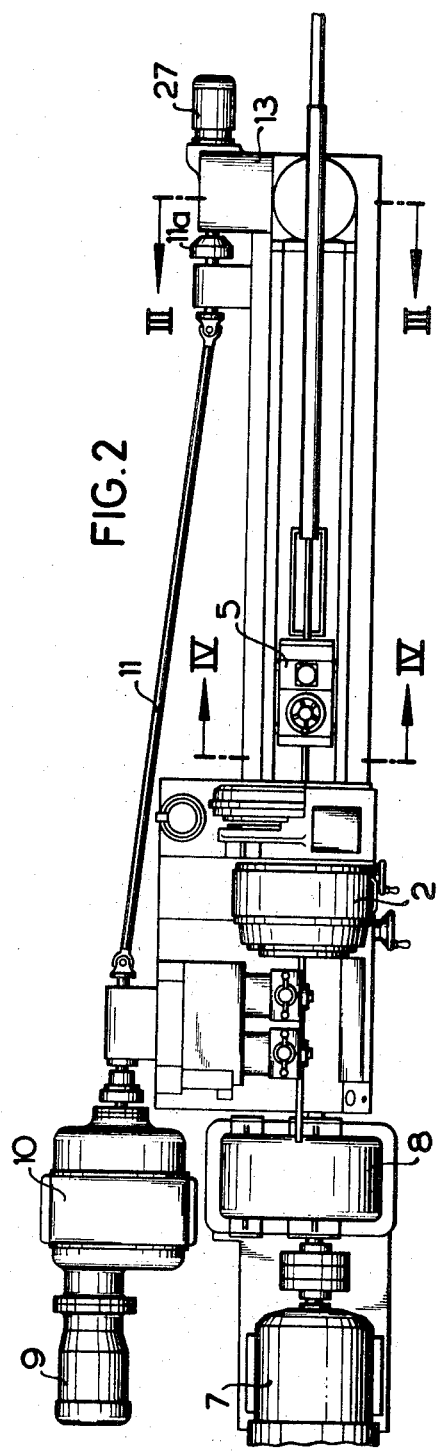

DRIVE MECHANISM FOR THE CLAMPING CARRIAGES OF PEELING MACHINES

This invention relates generally to drive mechanisms for machining apparatus and, more particularly, to a novel arrangement for movable clamping carriages of a metal bar or rod peller machine.

Peeling machines for working elongated stock, such as bars, rods or tubes, are well known in the art. In general, such machines include a machining component (e.g. cutting means), feed means for feeding the stock to be peeled into or through the cutting means, and clamping carriage, to receive the peeled stock and transport the same from the cutting means to a point removed from the cutting means. A suitable drive is provided for driving the stock feed, the cutting means, and in the case of the clamping carriage, as described hereinafter, means are provided for actuating the carriage to engage the peeled stock, and to reciprocate the carriage between first and second opposed stations.

In this art, various types of drive mechanisms for the carriage of such apparatus have been proposed. In one form, rack and pinion have been suggested for transmitting the force required to move the clamping carriage — see for example, German Patent No. 1,252,036. In this type of arrangement with the racks attached to the carriage, the cooperating pinions may be driven from a common variable speed motor through intermediate gearing, with separate motors being provided for return movement of the carriage. The movement of the carriage may be synchronized through the common intermediate drive.

In another prior art arrangement, the racks may be attached to the bed or frame of the apparatus rather than the carriage. In this arrangement, the cooperating pinions are mounted on the carriage, and driven by receiving motors connected to the carriage and operate with their transmitting motors through "electrical waves" — see for example, German Patent No. 1,089,615.

It is well known in this art that rack and pinion arrangements are generally costly to manufacture, and in addition, suffer from the further disadvantage that they must be accurately located in relation to the drive means. As a result, if the carriages have to be moved over long distances between their initial or first station and the terminal or second station, rack and pinion drive arrangements are known in this art to be unsuitable.

It has also been proposed in this art, in an attempt to overcome the above problems associated with rack and pinion drives, to utilize a double-acting piston arrangement in conjunction with oil pump motor; in which arrangement, pairs of rollers at the inlet end of the cutting means of the peeler would be driven by the oil pump means, with the carriage, arranged at the outlet end of the cutting means, being reciprocated by the double-acting piston device. In this type of arrangement, the rollers at the inlet end of the cutting device, functioning as advancing rollers to advance the stock to be machined into the cutting head, may be simply synchronized by feeding the oil released from the oil pump to the piston assembly of the carriage, utilizing an electro-magnetically actuated change-over valve. Such an arrangment is illustrated in German Patent No. 1,258,236. However, while this latter arrangement has several advantages, it also is unsuitable for peeling apparatus in which the carriage has to travel over very long distances between the first and second stations, since problems will arise in utilizing piston assemblies as driving means which are relatively long.

In accordance with this invention, applicant has developed a drive for use in the above-described type of apparatus which overcomes the disadvantages of the prior art arrangements. More particularly, the drive for clamping carriages of machining apparatus, particularly bar or rod peeling according the present invention, reduce the cost of such drive compared to proposed prior art arrangements, in addition to providing a more favorable economical advantage in the installation of such means for this type of apparatus. Still further, the device of the present invention permits high forward and reverse speeds for the carriages.

In accordance with this invention, there is provided the improvement in the above generally described peeling machine which includes movable clamping carriage adapted to engage machined stock, and to travel over a fixed path of travel, of rotatable drive means for movement of the clamping carriage, the drive comprising at least one pair of cooperating rotatable means rotatable about a fixed axis, track means for the rotatable drive means on which the rotatable drive means is adapted to rotate, and means for rotating at least one of the rotatable drive means and causing the rotatable drive means to be placed into frictional engagement with and to rotate on the track means, the track means and the rotatable means being mounted in operative relationship to each other and the clamp means so that when the means for rotating the rotatable drive means rotates this latter component, the rotatable drive means is effective to effect movement of the clamp means along the fixed path of travel.

In greater detail, and according to one preferred form of the invention, the pair of cooperating rotatable means desirably comprises a pair of spaced-apart opposed rotatable rollers. In one variation, the rollers may be connected to the clamping carraige per se; in another variation, the rollers may be fixedly mounted on the apparatus. In the embodiment where the rollers are mounted or connected to the clamping carriage, the track means on which the rollers are rotatable will be fixedly secured to the apparatus to permit relative movement of the rollers and clamping carriage along the track means to effect movement of the carriage over the fixed path of travel. In the other embodiment where the rollers are fixedly connected to e.g. the frame of the apparatus, the track means will be fixedly secured to the carriage so that upon relative rotation of the rollers with respect to the track means, the carriage and track means will be moved along the fixed path of travel.

The means for rotating the rotatable drive means or rollers may comprise any suitable device for rotating one or both of such rollers in such a manner that one or both of the rollers are driven on the track means. In one preferred embodiment, both rollers are maintained in contact with the track means — but, only one of which is driven by the drive means for rotating the same. The non-driven roller and the driven roller will be so arranged that upon rotating the driven roller, both rollers will be thus rotated. In the above and subsequent described embodiments, the track means, preferably of a form such that it includes opposed surfaces adapted to be engaged by a respective one of the rotatable rollers, is arranged between the opposed rollers, most desirably in a form such that the opposed rollers are in opposed aligned relationship.

A preferred form of the means for rotating the rotatable drive means comrises force exerting means, such as a piston assembly, acting to directly or indirectly place the roller into positive frictional engagement with the track means, and which piston assembly operates in conjunction with a suitable motor or the like for effecting actual rotation of the rotatable drive means or rollers. In this preferred embodiment, the motor, which may be any suitable conventional type, may mount the roller to be driven by virtue of the roller being journalled on a suitable shaft or the like, with the piston assembly acting to directly or indirectly exert force on the shaft mounting the driven roller to force it into positive frictional engagement with the track means. On the other hand, in a still further embodiment, forming the force exerting means may be mounted so as to act on the non-driven rotatable roller so that in such an arrangement, the drive means is effective to rotate a first one of the pair of rotatable rollers on the track means, with the opposed or other one of said pair of rotatable rollers being acted on by the piston assembly to force the said other roller into positive frictional engagement with the track means. In both embodiments, the arrangement of the opposed rollers and the drive means, will be such that the rotation of one roller by the drive means will be effective to cause rotation of the opposed roller.

The track means of the device of the present invention may be any suitable component capable of being used for this purpsoe. As outlined above, a preferred form of the track means comprises track means having opposed surfaces each of which is adapted to be engaged by a respective one of the rotatable rollers. The track means preferably forms a compression and tension rod extending along the path of travel of the carriage; the compression and tension rod thus forming an elongated strip. In the case where the track means is connected to the clamping carriage, and wherein the carriage and track means will thus move along the fixed path of travel between the rollers and by rotation of the latter, the track will have an appropriate length and be of a size sufficient to permit positive engagement with and between the opposed rollers. In the embodiment where the track means is fixedly secured to the apparatus, and with the rollers being mounted or connected to the clamp means, the track member may form a portion of, or be incorporated into, guide means for guiding the clamp means between the initial and terminal stations along its path of travel.

Still further, in a preferred embodiment of the present invention, the means for placing one of the rotatable rollers in operative frictional relationship to the track means — e.g. the tension and compression rod, preferably also includes means for maintaining this roller in contact with the track member or rod; preferably such means are incorporated into the means for causing the roller to be placed in frictional engagement with the track or rod. In one preferred form, and when utilizing a piston assembly or the like for placing the said roller into frictional engagement with the track or rod, the piston assembly may include means for normally urging the roller against the track — such means being, for example, a spring-loaded piston assembly such that the minimum force exerted by the spring loading of the piston component is sufficient to permit the piston component to directly or indirectly maintain the rotatable roller in contact with the guide track. In this latter embodiment, the rotatable roller may be mounted in a housing which is operatively connected to the piston assembly in such a manner that the force exerted by the spring loading of the piston on the housing of the roller is sufficient to urge the roller into contact or engagement with the track or compression and tension rod; whereby both rollers are always maintained in contact with the same compression and tension rod.

In a still further preferred embodiment of the present invention, there is also included a separate drive means for returning the carriage, following its travel from its initial station to its terminal point over a fixed path of travel, back to the initial station. In this embodiment, the separate drive means for returning the carriage preferably operates in conjunction with the device of the present invention to return the carriage at a faster rate of speed to its initial position, compared to the speed of travel from the starting position to its terminal point (which of course is limited to the speed at which the stock being machined is being drawn from the peeling apparatus).

As will be seen from the above, and subsequent description of preferred embodiments with respect to the drawings, the device of the present invention provides a very simple and economical expedient compared to the above-described prior art arrangements for moving carriages in peeling machines.

For a better understanding of the present invention, together with other and further objects thereof, reference is had to the following description taken in connection with the accompanying drawings, and its scope will be pointed out in the appended claims.

In the drawings:

FIG. 1 is a side elevational view of a typical bar or rod peeler incorporating the present invention;

FIG. 2 is a plan view of the apparatus of FIG. 1;

Figure 3:
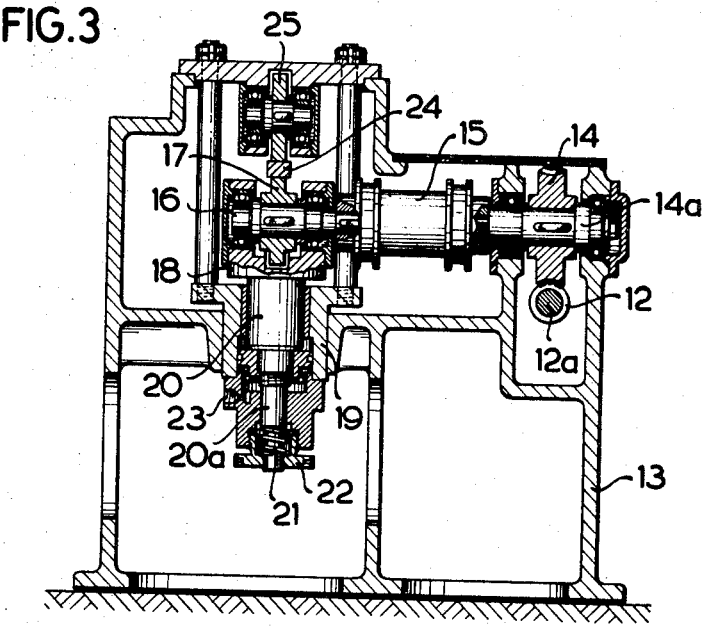
FIG. 3 is an enlarged sectional view taken along the line III—III of FIG. 2, illustrating one form of the drive means for the clamping carriage.
Figure 4:
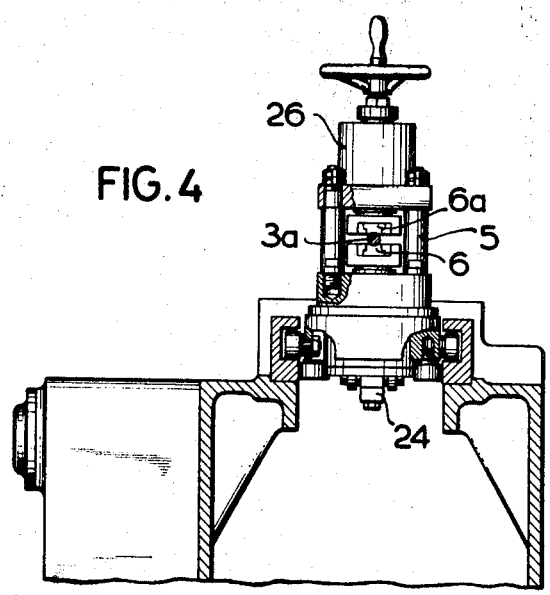
FIG. 4 is an enlarged section taken along the line IV—IV of FIG. 2, illustrating the mounting of the clamping carriage in greater detail.

Referring initially to FIGS. 1 to 4, reference numeral 1 indicates generally the peeling apparatus which includes a rotating cutting head (not illustrated in detail) which is mounted in the housing 2. Elongated stock (such as rods or pipes) which are to be machined - one piece of which is indicated by reference numberal 3, is guided into the cutting head by means of opposed pairs of advancing rollers 4. Once machined, clamp means in the form of a clamping carriage indicated by reference nomeral 5, which contains a pair of opposed clamping jaws 6 and 6a, are adapted to grip the machined workpiece indicated by reference numeral 3a and draw the machined stock from the rotating cutting head.

The cutting head may be driven by a motor 7, through intermediate gears indicated generally by reference numeral 8. The advancing rollers 4 may be driven by an electric motor 9 through intermediate gearing 10 — in this case, the drive shaft of this last-mentioned drive means includes an extension shaft 11 connected to a clutch 11a, which in turn is operatively connected to a worm gear 12 mounted in a housing 13 (as shown in FIG. 3). Housing 13 also mounts a worm gear 14, which is in engagement with the worm gear 12. Shaft 14a of worm gear 14 is connected, through a clutch 15, to shaft 16 of a first drive roller 17. The mounting collar or holder 18 of the drive roller 17, as will be seen from FIG. 3, is a component of a piston assembly indicated by reference numeral 20 operating in cylinder 19. The piston 20 includes an extension 20a, with a spring 21 being journalled about one end of the extension 20a and resting against a shoulder spaced from the end of the extension; the other end of the spring 21 being held by means of an adjustable abutment 22 threadably or otherwise engaged on the end of the extension 20a. Piston 20, a fluid actuated assembly (e.g. through air or liquid), when actuated, is effective to maintain the drive roller 17 in frictional engagement with a track which in the form illustrated, is a tension and compression rod 24 (i.e. the drive roller 17 is pressed against the rod 24). When no pressure is exerted by the pressure medium in cylinder 19 of the piston assembly, the drive roller 17 is only pressed against the tension and compression rod 24 by virtue of the force exerted by spring 21 through extension 20a and piston 20 of the collar 18. In addition to the drive roller 17, a second freely rotatable roller is provided, indicated by reference numeral 25, mounted in housing 13; roller 25 in this embodiment, normally engages the track or rod 24.

The above-described piston assembly includes a fluid conduit or bore in operative association therewith, indicated generally by reference numeral 23, through which a fluid can flow in and out of operative relationship to the piston assembly, whereby the fluid medium from a source (not shown) can exert a pressure on the piston assembly to actuate the same.

Figure 5:
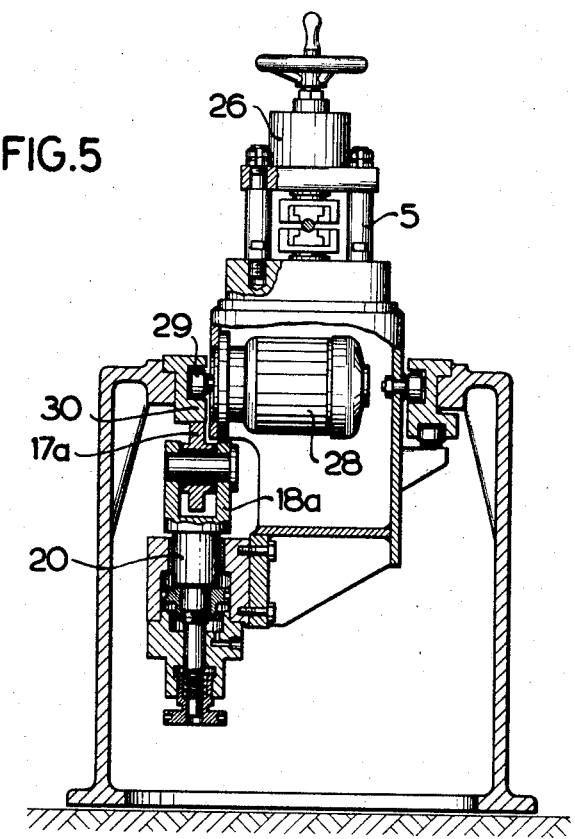
FIG. 5 is an enlarged cross-sectional view showing an alternate arrangement of the present invention.

In the above embodiment, the tension and compression rod or guide 24, is connected to the carriage. In a further embodiment, and where machining apparatus for machining large diameter workpieces or stock is required, and normally in such cases the feed velocity of the clamp means or carriage 5 is relatively low, there may be provided a drive roller 17a with drive means (such as motor 28) which can be arranged on the clamping carriage 5. In this case, the drive means or motor 28 must then be of a variable speed direct current type. In this embodiment, the previously described form of the invention may be modified such that a roller 29, of the clamping carriage 5, may be used in place of the roller 25. Roller 29, connected to the drive shaft of the motor 28, is adapted to frictionally engage a guide rail 30 for the clamping carriage 5 in such a manner that the roller 29 is firmly pressed against the guide rail 30 to transfer the force necessary to move the clamp carriage 5 by friction only. In this embodiment, as illustrated in FIG. 5, the above-described arrangement of FIG. 3, with respect to drive roller 17 (and which is numbered 17a in FIG. 5), the piston assembly 20 with extension 20a, spring 21 and adjustable abutment 22, are likewise employed with the piston assembly being operated in the above-described manner with the spring 21 being adapted to normally retain drive roller 17a in frictional engagement with the guide track 30; the piston assembly being actuated by a fluid medium capable of exerting a pressure on the cylinder 19 when desired.

In operation of the apparatus, a length of stock such as pipe or rod 3, is fed by the advancing rollers 4 into the cutter head 2 of the apparatus. The leading end of the machined stock, the latter being indicated by reference numeral 3a, as it emerges from the cutter head 2, is located between the jaws 6 and 6a. The jaw 6a is brought into clamping engagement with the machined stock by means of a piston operating in piston assembly 26; with the clutch 15 being simultaneously engaged to thereby impart movement to the drive roller 17 in engagement with the rod or guide 24, and to drive roller 25, and thus impart to the clamp means or clamp carriage 5, a feed velocity corresponding to that of the advancing rollers 4 and the speed at which the stock 3 is being machined. When the clamp carriage 5 has pulled the machined workpiece 3a completely from the cutter head, and the carriage 5 has reached its terminal position at the second station of the apparatus (at the right hand side of the machine bed 1a of FIG. 1), the clutch 11a, previously engaged, is then disengaged and motor 27 actuated. The drive shaft of motor 27a is connected (in a conventional manner, not shown) to the shaft 12a of the worm gear 12, so that the motor 27 is effective to return the carriage at a higher speed to the starting or initial position of the carriage (the position of the carriage as illustrated in FIGS. 1 and 2).

In the embodiment where the drive rollers 17 and 25 are mounted on the carriage 5, the apparatus will include a stationary tension rod along which the drive rollers may rotate.

The various components such as clutches 11a and 15, and motor 28, are all conventional components and they may be actuated in a known fashion by means of limit switches or the like, which in turn may be components of conventional sequence circuit arrangements for effective automatic operation of the machining device.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a metal bar or rod peeler apparatus having a movable clamping carriage adapted to engage machined stock and to travel over a fixed path of travel, the improvement of rotatable drive means for movement of said clamping carriage, said drive means comprising at least one pair of cooperating rotatable means rotatable about a fixed axis, track means for said rotatable drive means on which said rotatable drive means is adapted to rotate, and means for rotating at least one of said rotatable drive means and causing said rotatable drive means to be placed into frictional engagement with and to rotate on said track means, said track means and said rotatable means being mounted in operative relationship to each other and said clamping carriage whereby when said means for rotating said rotatable drive means rotates said latter means, said rotatable drive means is effective to effect movement of said clamping carriage along said fixed path of travel.

2. An apparatus as defined in claim 1, wherein said track means is fixedly connected to said clamping carriage, said rotatable drive means being effective to rotate along said track means to effect movement of said track means and clamping carriage over a fixed path of travel.

3. An apparatus as defined in claim 1, wherein said track means is non-movable, said rotatable drive means being connected to said clamping carriage, whereby when said rotatable means is rotated, movement of said clamping carriage and said rotatable drive means is effected along said non-movable track and over the fixed path of travel of said clamping carriage.

4. An apparatus as defined in claim 3, wherein said non-movable track means forms at least a portion of the guide means for guiding said clamping carriage over a fixed path of travel.

5. An apparatus as defined in claim 1, wherein said drive means drives only one of said pair of cooperating rotatable means, said cooperating rotatable means being normally maintained in contact with said track means whereby when said drive means drives said one of said rotatable means, both of said rotatable means are driven on said track means.

6. An apparatus as defined in claim 5, including means for placing at least one of said rotatable means in positive frictional engagement with said track means, said means for placing said rotatable means in positive frictional engagement with said track means comprising force exerting means acting in conjunction with said drive means with said force exerting means being effective to maintain said rotatable means in positive frictional engagement with said track means when said drive means is actuated to rotate said rotatable means.

7. An apparatus as defined in claim 6, wherein said force exerting means comprises a piston assembly acting on one of said rotatable means, said piston assembly further including means to normally urge the rotatable means on which said piston assembly acts to normally maintain contact with said track means when said piston assembly is not actuated.

8. An apparatus, as defined in claim 1, wherein said rotatable means comprises a pair of opposed rotatable rollers, said track means being located between said rollers with said rollers being normally maintained in contact with said track means, drive means for driving one of said rotatable rollers, and force exerting means for causing one of said rotatable rollers to be placed in positive frictional engagement with said track means upon rotation of said one roller by said drive means whereby both of said rollers rotate on said track means and are effective to effect movement of said clamping carriage along said fixed path of travel.

9. An apparatus, as defined in claim 1, said apparatus including separate drive means adapted to return said clamping carriage from a terminal or second station along said fixed path of travel to an initial or first station at which said clamping carriage is adapted to engage machined stock.

10. An apparatus, as defined in claim 8, wherein said track means are secured to said clamping carriage with said rollers engaging opposed surfaces of said track means, one of said rollers being freely mounted and engaging said track means, the other of said rollers being driven by said drive means, said force exerting means acting on said last-mentioned roller.

11. An apparatus, as defined in claim 8, wherein said track means is fixedly connected to said apparatus, said rollers being connected to said clamping carriage, one of said rollers normally engaging said track means with said drive means driving said last-mentioned roller, the other of said rollers being adapted to be maintained in positive frictional engagement with said track means by said force exerting means.

* * * * *